United States Patent
Sakaguchi et al.

(10) Patent No.: US 9,533,572 B2
(45) Date of Patent: Jan. 3, 2017

(54) ACCELERATOR REACTION FOR CONTROL APPARATUS

(75) Inventors: Shigeyuki Sakaguchi, Yokohama (JP); Masao Shiomi, Sagamihara (JP); Kenichi Tamura, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1380 days.

(21) Appl. No.: 13/055,006

(22) PCT Filed: Jul. 31, 2009

(86) PCT No.: PCT/IB2009/006423
§ 371 (c)(1),
(2), (4) Date: Jan. 20, 2011

(87) PCT Pub. No.: WO2010/013133
PCT Pub. Date: Feb. 4, 2010

(65) Prior Publication Data
US 2011/0125367 A1    May 26, 2011

(30) Foreign Application Priority Data

Jul. 31, 2008  (JP) .................................. 2008-197383
Jul. 31, 2008  (JP) .................................. 2008-197384
(Continued)

(51) Int. Cl.
*B60K 26/02*      (2006.01)
*F02D 11/02*      (2006.01)
(Continued)

(52) U.S. Cl.
CPC ............. *B60K 26/021* (2013.01); *F02D 11/02* (2013.01); *G05G 1/38* (2013.01); *G05G 5/03* (2013.01);
(Continued)

(58) Field of Classification Search
USPC ...................................................... 701/36, 70
See application file for complete search history.

(56) References Cited

U.S. PATENT DOCUMENTS 5,517,410 A *   5/1996   Nakagawa et al. ............. 701/51
8,532,900 B2 *  9/2013   Maruyama .............. F02D 11/02
                                                  180/282
(Continued)

FOREIGN PATENT DOCUMENTS

JP    3-217627 A      9/1991
JP    05231194    *  9/1993
(Continued)

OTHER PUBLICATIONS

Machine translation of JP 2005-132225.*
(Continued)

*Primary Examiner* — Jonathan M Dager
(74) *Attorney, Agent, or Firm* — Osha Liang LLP

(57) ABSTRACT

A control apparatus of a vehicle includes a detector to detect an opening degree of an accelerator, a controller to adjust a reaction force of the accelerator, wherein the controller is configured to increase the reaction force of the accelerator when the accelerator opening degree exceeds a threshold value, a first threshold value corresponding to a first vehicle driving force, and a second threshold value corresponding to a second vehicle driving force that is larger than the first vehicle deriving force, wherein the first threshold value is higher than the second threshold value.

17 Claims, 10 Drawing Sheets

(30) Foreign Application Priority Data

May 21, 2009 (JP) ................................ 2009-122999
May 21, 2009 (JP) ................................ 2009-123000

(51) Int. Cl.
    *G05G 1/38* (2008.04)
    *G05G 5/03* (2008.04)
    *F02D 11/10* (2006.01)

(52) U.S. Cl.
    CPC ....... *F02D 11/106* (2013.01); *F02D 2200/602* (2013.01)

(56) References Cited

U.S. PATENT DOCUMENTS

| | | | | |
|---|---|---|---|---|
| 8,670,913 | B2* | 3/2014 | Sakaguchi | B60K 26/021 701/36 |
| 8,844,401 | B2* | 9/2014 | Sakaguchi | F02D 11/02 701/70 |
| 9,358,885 | B2* | 6/2016 | Bowers | G05G 1/30 |
| 9,365,112 | B2* | 6/2016 | Maruyama | B60K 6/48 |
| 2003/0190996 | A1* | 10/2003 | Yone | B60K 31/00 477/120 |
| 2004/0059482 | A1* | 3/2004 | Hijikata | 701/36 |
| 2005/0056253 | A1* | 3/2005 | Yone | F02D 11/106 123/399 |
| 2005/0279554 | A1* | 12/2005 | Kobayashi et al. | 180/197 |
| 2008/0140294 | A1* | 6/2008 | Park | 701/93 |
| 2010/0204883 | A1* | 8/2010 | Honda | B60K 6/365 701/36 |
| 2010/0274459 | A1* | 10/2010 | Suzaki | B60K 26/021 701/93 |
| 2010/0299037 | A1* | 11/2010 | Sakaguchi | B60K 26/021 701/70 |
| 2011/0087414 | A1* | 4/2011 | Shiomi | B60K 26/021 701/70 |
| 2011/0098900 | A1* | 4/2011 | Shiomi | B60K 26/021 701/70 |
| 2011/0098901 | A1* | 4/2011 | Shiomi | F02D 11/02 701/70 |
| 2012/0059563 | A1* | 3/2012 | Sakaguchi | B60K 26/021 701/70 |
| 2012/0191312 | A1* | 7/2012 | Kimura | B60W 50/16 701/70 |
| 2013/0066508 | A1* | 3/2013 | Ueno | B60K 6/48 701/22 |
| 2013/0118295 | A1* | 5/2013 | Sakaguchi | B60K 26/021 74/513 |

FOREIGN PATENT DOCUMENTS

| | | |
|---|---|---|
| JP | 9-249043 A | 9/1997 |
| JP | 10-166890 A | 6/1998 |
| JP | 2003-219230 A | 7/2003 |
| JP | 2005-132225 A | 5/2005 |
| JP | 2007-126038 A | 5/2007 |
| JP | 2007-316720 A | 12/2007 |
| JP | 2007-76468 A | 10/2008 |
| RU | 2033931 C1 | 4/1995 |
| WO | 2007/080731 A1 | 7/2007 |

OTHER PUBLICATIONS

Machine translation of JP 5-231194.*
Russian Decision of Grant for Application No. 2011107196, mailed on Jun. 5, 2012 (11 pages).
International Notification of Transmittal and Preliminary Report on Patentability for International Application No. PCT/IB2009/006423 mailed May 24, 2011 (13 pages).
Chinese Office Action for Application No. 200980130569.7, mailed on Nov. 28, 2012 (6 pages).
Written Opinion in PCT/IB2009/006423 dated Jan. 25, 2011 (5 pages).
English Patent Abstract of JP2008236975 from esp@cenet.com, published Oct. 2, 2008 (1 page).
International Search Report from PCT/IB2009/006423 dated Oct. 27, 2009 (2 pages).
Extended European Search Report in counterpart European Application No. EP09802584.4 issued on Feb. 19, 2014 (7 pages).

* cited by examiner

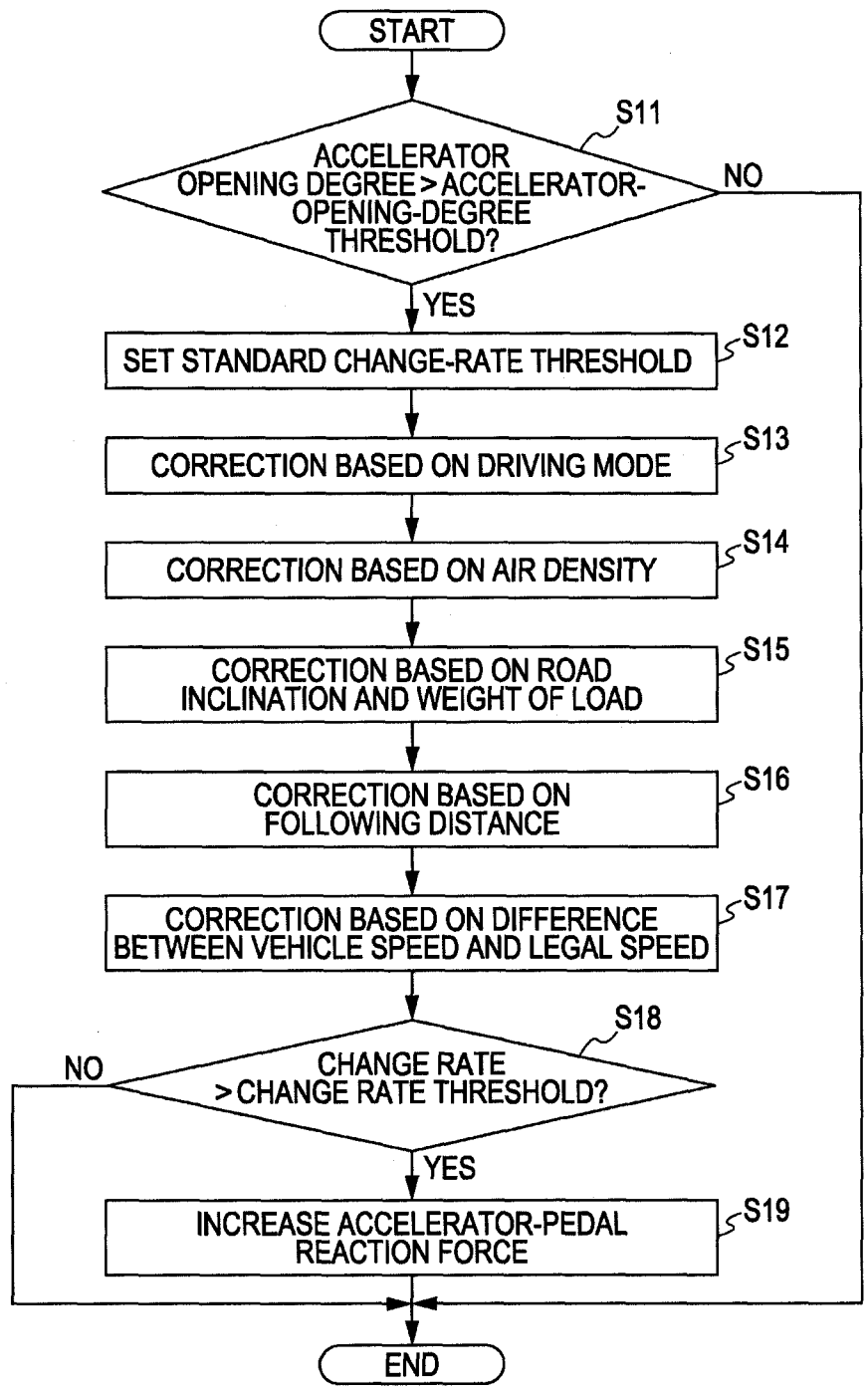

ACCELERATOR REACTION FOR CONTROL APPARATUS

CROSS-REFERENCE TO RELATED APPLICATIONS

The present application claims priority from Japanese Patent Application No. 2008-197384, filed Jul. 31, 2008, Japanese Patent Application No. 2008-197383, filed Jul. 31, 2008, Japanese Patent Application No. 2009-122999, filed May 21, 2009, and Japanese Patent Application No. 2009-123000, filed May 21, 2009. The contents of all four priority applications are hereby incorporated by reference in their entirety.

BACKGROUND OF THE DISCLOSURE

Field of the Disclosure

The present invention relates to an accelerator reaction force control apparatus which controls a reaction force of an accelerator of a vehicle.

Description of the Related Art

Japanese Unexamined Patent Application Publication No. 2007-76468 (hereinafter referred to as Patent Document 1) discloses a technique for calculating an optimum amount of operation (optimum amount of depression) of an accelerator on the basis of a driving environment in which a vehicle is being driven. The optimum amount of operation is an amount of operation at which an optimum specific fuel consumption can be obtained. According to this technique, the calculated optimum amount of operation is corrected in accordance with the condition of the road in front of the vehicle. When a driver depresses the accelerator and the amount of operation becomes close to the corrected optimum amount of operation, an operational reaction force of the accelerator is increased stepwise. According to Patent Document 1, the optimum amount of operation is corrected such that the optimum amount of operation is reduced when the road in front of the vehicle is sloping downward or curved.

In the case where the road in front of the vehicle is sloping downward, the speed of the vehicle generally increases and the following distance to another vehicle decreases. Therefore, there is a high possibility that a brake will be applied. In addition, in the case where the road in front of the vehicle is curved, there is also a high possibility that a brake will be applied to facilitate the control of the vehicle when the vehicle enters the curve. Thus, according to Patent Document 1, the optimum amount of operation is reduced in the case where there is a high possibility that a brake will be applied, as in the case where the road in front of the vehicle is sloping downward or curved. As a result, the vehicle speed is reduced and the vehicle is prevented from driving along the road in front of the vehicle at an excessively high speed. In addition, an increase in the specific fuel consumption may be suppressed.

According to the technique discussed in Patent Document 1, a threshold of an accelerator opening degree or an accelerator depressing speed is set such that the optimum specific fuel consumption may be obtained, and the reaction force of the accelerator is increased at the threshold. However, the accelerator is a main device operated by the driver to operate the vehicle in a way that the driver desires. Therefore, the operational feel of the accelerator and the influence thereof on the vehicle driving performance directly affect the overall feeling of the driver. For this reason, this type of reaction-force control apparatus which contributes to the reduction in fuel consumption cannot be put into practical use unless the reduction in fuel consumption can be achieved together with satisfactory feel of the accelerator and operability of the vehicle.

Various tests for putting the reaction-force control apparatus which contributes to the reduction in fuel consumption into practical use have been conducted. As a result of these tests, it was found that the driver feels an uncomfortable sensation if the reaction force is simply increased at the threshold of the accelerator opening degree or the depressing speed set from the viewpoint of reducing the fuel consumption as in Patent Document 1. More specifically, in this type of reaction-force control apparatus, the reaction force of the accelerator is suddenly increased while the driver is trying to accelerate the vehicle. Therefore, when, for example, a driving force required to accelerate the vehicle is relatively large, the vehicle cannot be accelerated as intended by the driver, and this makes the driver feel uncomfortable.

SUMMARY OF THE CLAIMED SUBJECT MATTER

In one aspect, the present disclosure relates to a control apparatus of a vehicle including a means for detecting a position of an accelerator, a means for setting a predetermined accelerator threshold value, and a means for adjusting a reaction force of the accelerator, wherein the means for adjusting is configured to increase the reaction force of the accelerator when the accelerator opening degree exceeds the predetermined threshold value, wherein a first vehicle condition in which a first rate of vehicle speed change at a predetermined driving force comprises a first predetermined accelerator threshold value to increase the reaction force of the accelerator and a second vehicle condition in which a second rate of vehicle speed change at the first predetermined driving force comprises a second predetermined accelerator threshold value to increase the reaction force of the accelerator, and wherein the first rate of vehicle speed change is lower than the second rate of vehicle speed change, and the first predetermined accelerator threshold value is larger than the second predetermined accelerator threshold value.

In another aspect, the present disclosure relates to a control apparatus of a vehicle including a means for detecting an opening degree of an accelerator, a means for adjusting a reaction force of the accelerator, wherein means for adjusting is configured to increase the reaction force of the accelerator when the accelerator opening degree exceeds a threshold value, a first threshold value corresponding to a first vehicle driving force, and a second threshold value corresponding to a second driving force that is larger than the first vehicle driving force, wherein the first threshold value is higher than the second threshold value.

In another aspect, the present disclosure relates to a method to control a vehicle including detecting an opening degree of an accelerator, adjusting a reaction force of the accelerator, increasing the reaction force of the accelerator when the accelerator opening degree exceeds a threshold value, and setting the threshold value in response to a determined vehicle driving force.

In another aspect, the present disclosure relates to a control apparatus of a vehicle, including a detector to detect an opening degree of an accelerator, a controller to adjust a reaction force of the accelerator, wherein the controller is configured to increase the reaction force of the accelerator when the accelerator opening degree exceeds a threshold value, a first threshold value corresponding to a first vehicle driving force, a second threshold value corresponding to a second vehicle driving force that is larger than the first vehicle deriving force, and wherein the first threshold value is higher than the second threshold value.

BRIEF DESCRIPTION OF DRAWINGS

Features of the present disclosure will become more apparent from the following description in conjunction with the accompanying drawings.

FIG. 11 is a flowchart of a reaction-force control process according to the second exemplary embodiment of the present disclosure.

DETAILED DESCRIPTION

Embodiments of the present disclosure will be described in detail below with reference to the drawings.

An accelerator reaction force control apparatus 100 generally controls a reaction force (operational reaction force) of an accelerator 2 provided in a vehicle body 1 of a vehicle (not shown). While the term "accelerator pedal" or "accelerator" is used throughout this specification, it should be understood that such terms should not be limited to any particular embodiment or style of input device. In particular, while a "pedal" inside the passenger compartment is described, it should be understood that the "accelerator" may be a device in the engine compartment responsive to electrical, hydraulic, or mechanical signals produced by a pedal (or other device) in the passenger compartment. Additionally, while the device in the passenger compartment is described as a pedal, it should be understood that various other regulating devices (e.g., levers, switches, buttons, etc) may be used as "accelerators" or as devices that signal an "accelerator." As described below, the accelerator reaction force control apparatus 100 may include means for detecting an opening degree (amount of depression) of the accelerator 2 provided in the vehicle, means for detecting a change rate of the opening degree (speed of depression) of the accelerator 2 provided in the vehicle, and means for changing the reaction force of the accelerator 2 from a basic reaction force. The basic reaction force may be an operational reaction force set relative to an amount of depression of the accelerator, such as a conventional accelerator. And, the basic reaction force may be set to be increased depending on the increase of the amount of depression of the accelerator approximately proportionally. When the opening degree of the accelerator 2 exceeds a predetermined accelerator-opening-degree threshold, or when a change rate of the opening degree of the accelerator 2 exceeds a predetermined change-rate threshold, the reaction force of the accelerator 2 may be increased from the basic reaction force amount. The increased reaction force amount is equal to the basic reaction force plus the added reaction force. Thus, the difference between the amount of an increased reaction force and the basic reaction force at same depression of the accelerator, is an increase of the reaction force by the accelerator-pedal reaction force control apparatus. The basic reaction force will be described in detail below with reference to FIG. 3.

Figure 1:
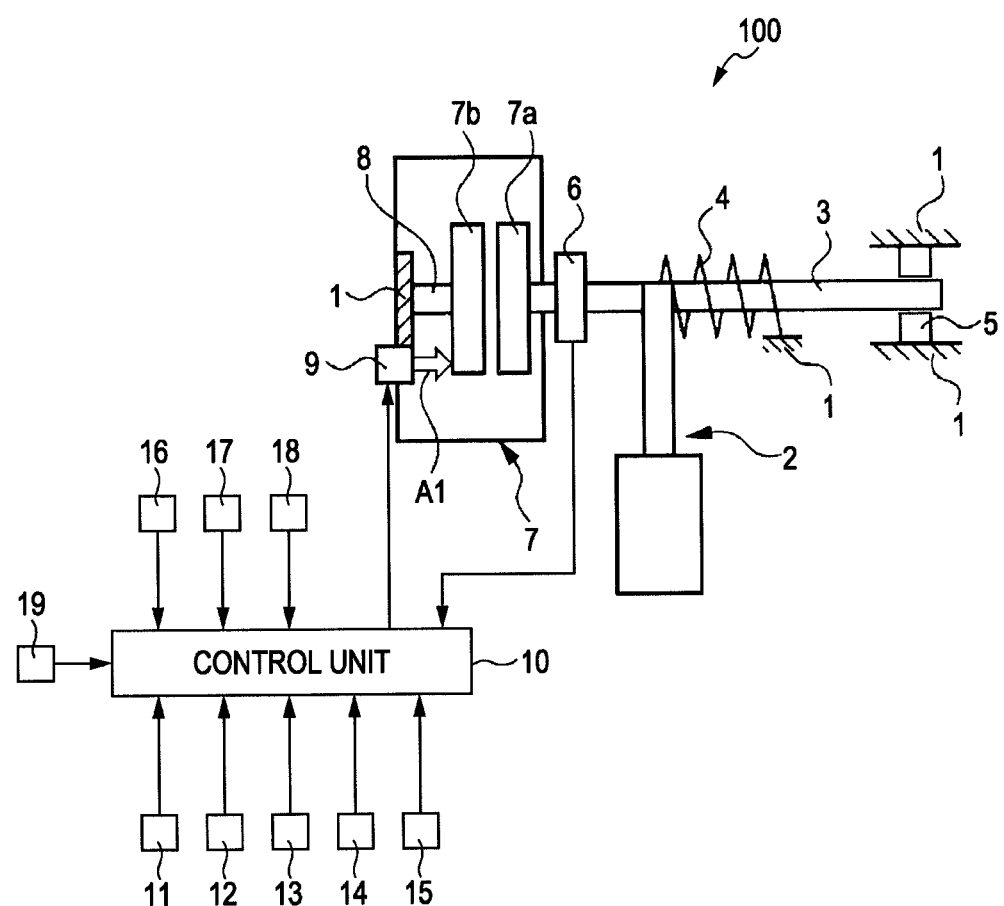
FIG. 1 is a schematic diagram illustrating the system structure of an accelerator reaction force control apparatus according to embodiments of the present disclosure together with a reaction-force changing mechanism.
Figure 2:
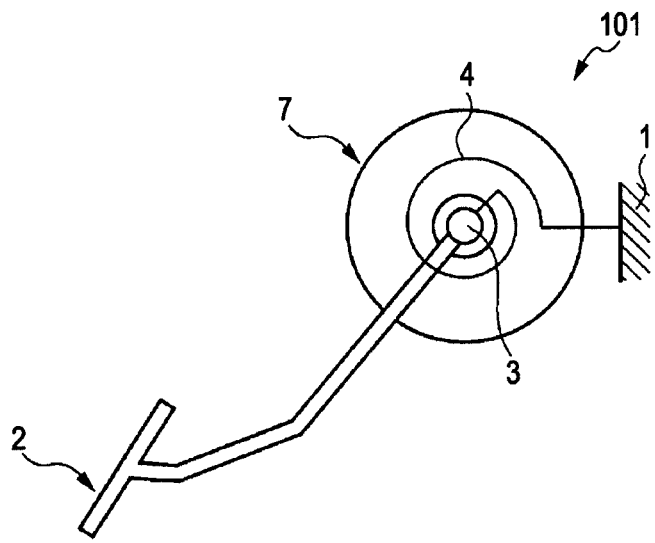
FIG. 2 is a schematic diagram illustrating an example of a reaction-force changing mechanism according to embodiments of the present disclosure.

As shown in FIGS. 1 and 2, the accelerator 2 may be provided on a rotating shaft 3 such that the accelerator 2 can pivot about the rotating shaft 3. The accelerator 2 may receive a reaction force in a closing direction thereof from a return spring 4 which may be fixed to the vehicle body 1 at one end thereof and to the rotating shaft 3 at the other end thereof. Various types of springs may be used as the return spring 4. The rotating shaft 3 may be rotatably supported by a bearing 5 provided on the vehicle body 1 at one end thereof. An accelerator position sensor 6, which may serve as an accelerator-opening-degree detecting means and accelerator-opening-degree change-rate detecting means, may be provided near the other end of the rotating shaft 3. The accelerator position sensor 6 may output a signal corresponding to the position (opening degree) of the accelerator 2, and the change rate of the opening degree may be determined from the amount of change in the opening degree within a small period of time.

In the present exemplary embodiment, an amount of depression of the accelerator 2 (accelerator opening degree) may be associated with an opening degree of a throttle valve (not shown) of an internal combustion engine (not shown) so that the throttle valve opening of the internal combustion engine increases in accordance with the amount of depression of the accelerator 2. Thus, the amount of fuel injection (amount of fuel consumption) increases in accordance with the accelerator opening degree.

A reaction-force changing mechanism 101 may include a variable friction plate 7 which may further include a pair of friction members 7a and 7b which face each other and which may apply a frictional force against the rotation of the rotating shaft 3. One friction member 7a may be mechanically fixed to an end portion of the rotating shaft 3, and the other friction member 7b may be supported by a fixed shaft 8 with a spline, or the like, provided therebetween so that the friction member 7b may be movable in an axial direction but is not rotatable. The fixed shaft 8 may be fixed to and supported by the vehicle body 1. An actuator (for example, an electromagnetic solenoid) 9 which is capable of urging the friction member 7b against the friction member 7a may be fixed to the vehicle body 1.

In the variable friction plate 7, the actuator 9 may operate to move the friction member 7b in the axial direction (direction shown by the arrow A1 in FIG. 1), and thereby may change the frictional force applied between the friction member 7a and the friction member 7b. The operation of the actuator 9 may be controlled by a control unit 10. Thus, the control unit 10 may be capable of controlling the operation of the actuator 9 so as to change the reaction force applied to the accelerator 2 against the depression thereof by changing the frictional force applied to the rotating shaft 3.

The control unit 10 may receive signals from various sensors including the accelerator position sensor 6 which detects the opening degree of the accelerator 2, an acceleration sensor 11 which determines an inclination of a road from an inclination of the vehicle, an atmospheric pressure sensor 12 which detects an ambient atmospheric pressure, an intake air temperature sensor 13 which detects an intake air temperature, a vehicle speed sensor 14 which detects a vehicle speed, a seat pressure sensor 15 which is installed in a vehicle seat (not shown) to detect whether or not an occupant is sitting in the seat, and a gear position sensor 16 which detects a speed-change ratio of a transmission. The control unit 10 may also receive information from a car navigation system 17 which may provide a current position of the vehicle and a map of an area around the current position and a signal from a laser radar 18 which may detect a following distance between the vehicle and a vehicle in front.

The transmission may be, for example, a continuously variable transmission capable of continuously varying the gear ratio. However, the transmission may also be an automatic transmission including a multi-speed auxiliary transmission and a torque converter or a manual transmission. In the case where the continuously variable transmission is used, the speed-change ratio may be determined as a ratio between rotational speeds of an input shaft and an output shaft.

Figure 3:
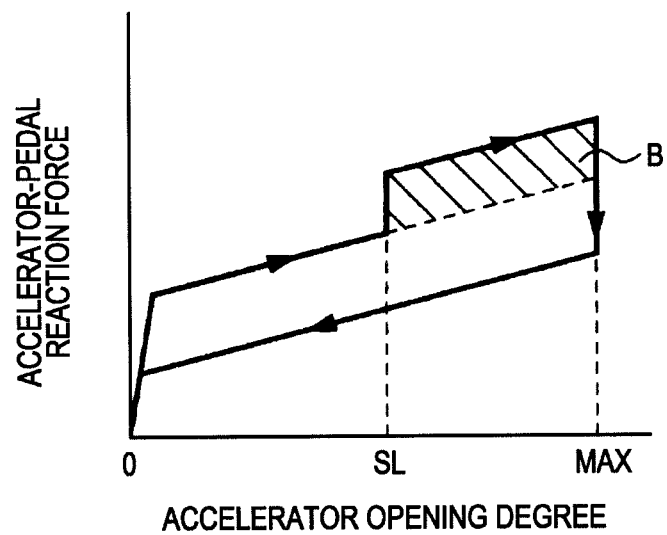
FIG. 3 is a characteristic diagram showing the characteristics of the accelerator reaction force according to a first exemplary embodiment of the present disclosure.

FIG. 3 schematically shows the characteristic of the accelerator reaction force according to a first exemplary embodiment. The basic reaction force substantially changes in proportion to the accelerator opening degree with a suitable hysteresis depending on whether the accelerator is operated in an opening-degree-increasing direction or in an opening-degree-reducing direction. When the accelerator opening degree is increased, that is, when the accelerator is depressed, and the accelerator opening degree exceeds a predetermined accelerator-opening-degree threshold (denoted by SL in FIG. 3), the accelerator reaction force is increased stepwise from the basic reaction force. In FIG. 3, the shaded area B corresponds to the increase in the accelerator reaction force. When the accelerator reaction force is increased stepwise, further depression of the accelerator 2 by the driver is suppressed and the driver can be informed that the driving state has been changed to a state in which the specific fuel consumption is high (fuel efficiency is low).

The increase in the reaction force of the accelerator 2 for the accelerator-opening-degree increasing direction may be immediately eliminated when, for example, the operating direction of the accelerator 2 is changed to an accelerator-opening-degree reducing direction. Alternatively, the increase in the reaction force of the accelerator 2 for the accelerator-opening-degree increasing direction may be eliminated when the accelerator-opening-degree is reduced and becomes equal to or less than the above-described predetermined accelerator-opening-degree threshold.

In the present exemplary embodiment, referring to FIG. 4, the control unit 10 may change the accelerator-opening-degree threshold at which the reaction force of the accelerator 2 is increased as follows. That is, the accelerator-opening-degree threshold may be changed in accordance with a vehicle speed at the time when the operation of increasing the opening degree of the accelerator 2 is started by the driver, that is, in accordance with an initial vehicle speed at the time when the accelerator 2 is depressed from a completely closed state or a partially opened state. More specifically, if the vehicle speed at the time when the opening degree of the accelerator 2 starts to increase is low, a first accelerator-opening-degree threshold, which is relatively low, may be selected. If the vehicle speed at the time when the opening degree of the accelerator 2 starts to increase is high, a second accelerator-opening-degree threshold, which is relatively high, may be selected.

In the case where the vehicle speed is low at the time when the operation of increasing the opening degree of the accelerator 2 is started, the reaction force may be increased at a relatively small accelerator opening degree. Therefore, a reaction-force increasing range between the accelerator-opening-degree threshold and a maximum accelerator opening degree is large. In contrast, in the case where the vehicle speed is high at the time when the operation of increasing the opening degree of the accelerator 2 is started, the reaction force is not increased until the accelerator opening degree exceeds a relatively large accelerator opening degree. Therefore, a reaction-force non-increasing range between the accelerator opening degree corresponding to the completely closed state and the accelerator-opening-degree threshold is relatively large.

Figure 4:
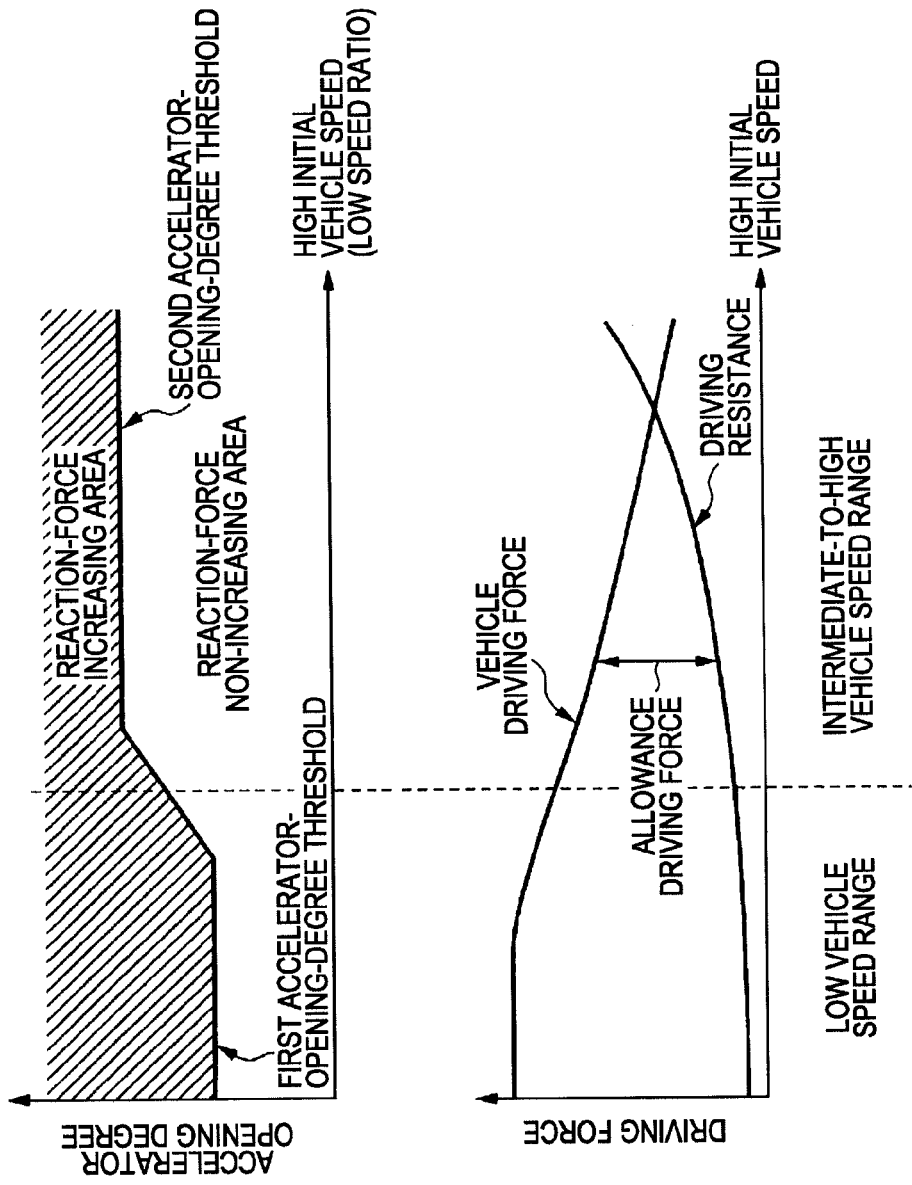
FIG. 4 is a diagram illustrating the relationship between the accelerator-opening-degree threshold, the driving force obtained at a maximum accelerator opening degree, and the driving resistance.

In the range between the first accelerator-opening-degree threshold and the second accelerator-opening-degree threshold, the accelerator-opening-degree threshold may continuously change from the first accelerator-opening-degree threshold to the second accelerator-opening-degree threshold in accordance with the vehicle speed, as shown in FIG. 4.

FIG. 4 is a schematic diagram illustrating the relationship between the accelerator-opening-degree threshold, the driving force characteristic at the maximum accelerator opening degree obtained under the assumption that speed change control is suitably performed, and the driving resistance, with respect to the vehicle speed represented by the horizontal axis. As shown in FIG. 4, in a low vehicle speed range which corresponds to, for example, a period immediately after the vehicle is started from a stopped state, the speed-change ratio of the transmission is high. Therefore, the vehicle driving force obtained at the maximum accelerator opening degree is relatively large. Because a large vehicle driving force is generated even when the amount of operation of the accelerator is small, there is a high possibility that excessive vehicle driving force will be generated and unnecessary acceleration may be performed. Therefore, in the low vehicle speed range, the accelerator-opening-degree threshold may be set to the first accelerator-opening-degree threshold, which is relatively low. Because the reaction force of the accelerator 2 is increased at a relatively small accelerator opening degree, excessive depression of the accelerator 2 by the driver may be suppressed and the overall fuel consumption may be reduced.

In an intermediate-to-high vehicle speed range, the speed-change ratio of the transmission is low. Therefore, the vehicle driving force obtained at the maximum accelerator opening degree is relatively small, and an amount of increase in the vehicle driving force corresponding to a certain amount of operation of the accelerator is also relatively small. Therefore, unnecessary acceleration does not easily occur. In addition, in the intermediate-to-high vehicle speed range, the driving resistance (air resistance and rolling resistance) of the vehicle is high, and therefore a large driving force may be required to maintain the vehicle speed. In addition, an allowance driving force, which is a difference between the vehicle driving force at the maximum accelerator opening degree and the driving resistance, is small. If the reaction force of the accelerator 2 is increased in this state, it becomes difficult to further depress the accelerator 2 and the vehicle may not be accelerated. Therefore, in the intermediate-to-high vehicle speed range, the accelerator-opening-degree threshold may be set to the second accelerator-opening-degree threshold, which is relatively high. Thus, the reaction force may be maintained at the basic reaction force and quick depression of the accelerator 2 may be allowed until the accelerator opening degree exceeds a relatively large accelerator opening degree. As a result, the vehicle may be smoothly accelerated.

The accelerator-opening-degree threshold may continuously change between the first accelerator-opening-degree threshold and the second accelerator-opening-degree threshold in accordance with the vehicle speed. Therefore, the accelerator 2 may be operated without making the driver feel an uncomfortable sensation. Even when the vehicle speed is at the boundary between the low vehicle speed range and the intermediate-to-high vehicle speed range, the accelerator-opening-degree threshold is not changed stepwise at a certain vehicle speed. Therefore, the driver may operate the accelerator 2 without feeling an uncomfortable sensation. In the above-described exemplary embodiment, the accelerator-opening-degree threshold may be set based on two stages, that is, between the first accelerator-opening-degree threshold and the second accelerator-opening-degree threshold. However, the present disclosure is not limited to this, and the accelerator-opening-degree threshold may also be set based on three or more stages. Alternatively, the accelerator-opening-degree threshold may be set such that the accelerator-opening-degree threshold is continuously changed over the entire vehicle speed range.

In the above-described exemplary embodiment, the vehicle speed is used as a parameter which shows the driving resistance of the vehicle and the driving force characteristic at the maximum accelerator opening degree. Therefore, the accelerator-opening-degree threshold is substantially set in consideration of both the driving resistance of the vehicle and the driving force characteristic at the maximum accelerator opening degree. However, the accelerator-opening-degree threshold may also be set on the basis of only the driving force characteristic at the maximum accelerator opening degree. For example, the speed-change ratio of the transmission may be used as a parameter which shows the driving force characteristic at the maximum accelerator opening degree, and the accelerator-opening-degree threshold may be set in accordance with the current speed-change ratio. FIG. 4 shows the driving force characteristic at the maximum accelerator opening degree in the case where, for example, the transmission is a continuously variable transmission. The driving force characteristic with respect to the vehicle speed in the case where the transmission is an automatic transmission including a multi-speed auxiliary transmission or a manual transmission is basically similar to the driving force characteristic shown in FIG. 4. More specifically, the vehicle driving force is large in the low vehicle speed range because the speed-change ratio is high, and the vehicle driving force is small in the intermediate-to-high vehicle speed range because the speed-change ratio is low. Therefore, in the case where, for example, the transmission is a multi-speed transmission, the accelerator-opening-degree threshold may be selected from a plurality of thresholds in accordance with the speed-change ratio of the transmission.

The accelerator-opening-degree threshold may also be set using a parameter other than the vehicle speed as a parameter which shows the driving resistance. For example, the driving resistance of the vehicle increases when the inclination of the road (the sign of the inclination is positive for the ascending road) is large or when the weight of load on the vehicle is large (for example, when a large number of people are on board). Therefore, the accelerator-opening-degree threshold for when the inclination is large may be set to be higher than the accelerator-opening-degree threshold for when the inclination is small. In addition, the accelerator-opening-degree threshold for when the weight of the load is large may be set to be higher than the accelerator-opening-degree threshold for when the weight of the load is small.

The inclination of the road may be determined from a detection value obtained by the acceleration sensor 11 (inclination detecting means). In the case where the current position and map information of an area around the current position may be obtained from the car navigation system 17, the inclination of the road on which the vehicle is currently traveling may also be determined from the map information. The number of people on board may be determined from, for example, a signal from the seat pressure sensor 15 placed in each seat (vehicle load-weight detecting means).

Figure 5:
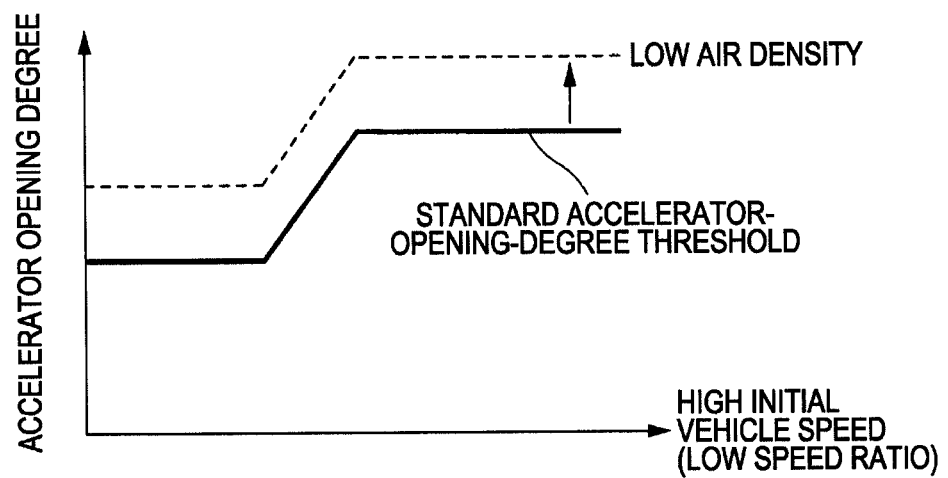
FIG. 5 is a characteristic diagram illustrating the manner in which the accelerator-opening-degree threshold relative to the vehicle speed is corrected in accordance with an air density.

As described above, the accelerator-opening-degree threshold may be set on the basis of the driving resistance of the vehicle or the driving force characteristic at the maximum accelerator opening degree. The determined accelerator-opening-degree threshold may also be corrected in accordance with other factors, as shown in FIG. 5. The accelerator-opening-degree threshold may be corrected in accordance with, for example, a density of air introduced into the internal combustion engine, a driving mode, such as a sports mode and an economy mode, a following distance behind a vehicle in front, or a difference between the current speed and a legal speed.

The correction based on the air density may be performed to compensate for a reduction in the output of the internal combustion engine due to a reduction in the air density, which may occur in a high-altitude environment or a high-temperature environment. As shown by the dashed line in FIG. 5, the accelerator-opening-degree threshold is increased as the air density decreases. The air density may be determined by a known detection method on the basis of an ambient atmospheric pressure and an ambient temperature at the place where the vehicle is currently located (air-density detecting means). The altitude of the position where the vehicle is currently located may be calculated from a detection value obtained by the atmospheric pressure sensor 12. Alternatively, in the case where the current position and the map information of the area around the current position may be obtained from the car navigation system 17, the altitude of the current position may be determined from the map information. The ambient temperature may be determined from a detection value obtained by the intake air temperature sensor 13. The air density may also be directly determined from the detection value obtained by the atmospheric pressure sensor 12.

With regard to the correction based on the driving mode, the accelerator-opening-degree threshold is increased, as in the case shown in FIG. 5, when the current driving mode is a mode which requires high acceleration performance. As is well known, a speed-changing pattern or the like of the automatic transmission, for example, may be changed in accordance with the driving mode.

In the case where, for example, the vehicle is provided with a driving-mode selection switch 19, the driving mode of the vehicle may be easily determined from the position of the driving-mode selection switch 19 (driving-mode determining means). The accelerator-opening-degree threshold for when the driving mode which requires high acceleration performance (for example, a sports mode) is selected by the switch operation may be set to be higher than the accelerator-opening-degree threshold for when a normal driving mode is selected. Alternatively, the driving tendency of the driver may be learned from the driving history of the driver, and it may be determined that the driver prefers a driving style which requires high acceleration performance if the driver tends to depress the accelerator 2 by a large amount. In such a case, it may be assumed that the driving mode which requires high acceleration performance is constantly selected.

With regard to the correction based on the following distance between the vehicle and a vehicle in front, the accelerator-opening-degree threshold may be increased as the following distance increases.

The following distance behind the vehicle in front may be detected by a following-distance detecting device which uses the laser radar 18. The following-distance detecting device determines the following distance behind the vehicle in front by emitting a laser beam toward the vehicle in front and receiving the laser beam reflected by the vehicle in front.

The accelerator-opening-degree threshold may also be corrected on the basis of the difference between the currently vehicle speed and the legal speed for the road on which the vehicle is currently traveling. Here, it is assumed that the current vehicle speed is lower than the legal speed. In this case, the current position and the map information of the area around the current position may be obtained from the car navigation system 17, and the legal speed for the road on which the vehicle is currently traveling is determined from the map information (legal-speed detecting means). Assuming that the current vehicle speed is lower than the legal speed for the road on which the vehicle is currently traveling, the correction may be performed such that the accelerator-opening-degree threshold is increased as the difference between the legal speed and the current vehicle speed increases. This correction may be performed to allow smooth acceleration to the legal speed and suppress the acceleration when the vehicle speed is equal to or higher than the legal speed.

Thus, the accelerator-opening-degree threshold determined on the basis of the driving resistance or the driving force characteristic at the maximum accelerator opening degree may be corrected on the basis of, for example, the air density, the driving mode, the following distance behind the vehicle in front, or the difference between the current vehicle speed and the legal speed. Thus, the reaction force of the accelerator 2 may be adequately increased and the vehicle may be smoothly driven in accordance with the intention of the driver.

Therefore, the problem that the vehicle may not be accelerated as intended by the driver when, for example, a relatively large driving force is required to accelerate the vehicle may be prevented. In addition, the vehicle may be prevented from giving the driver a wrong impression that the vehicle simply has poor acceleration performance.

Figure 6:
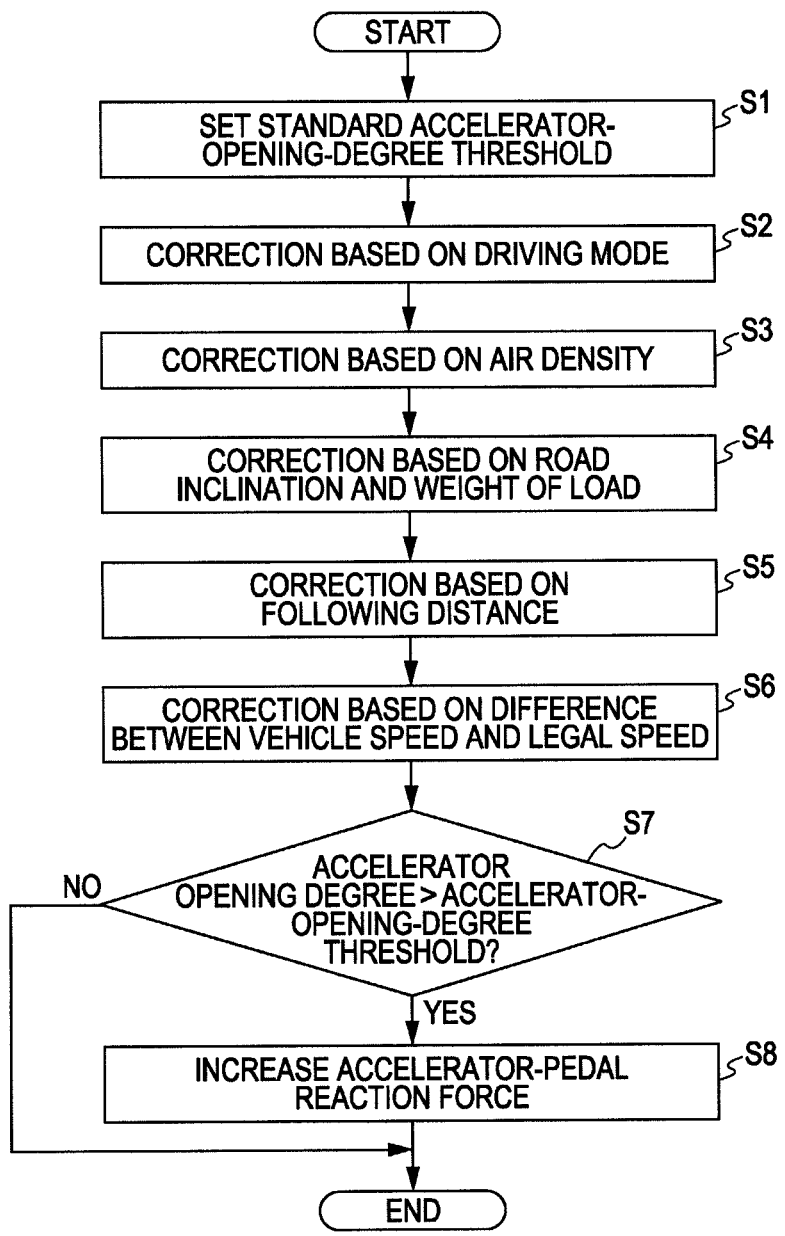
FIG. 6 is a flowchart of a reaction-force control process according to the first exemplary embodiment of the present disclosure.

FIG. 6 is a flowchart of an accelerator reaction force control process according to the present disclosure. The flowchart will now be described.

In Step 1, the vehicle speed at the time when the opening degree of the accelerator 2 has started to increase is detected. Then, a standard accelerator-opening-degree threshold (a base accelerator-opening-degree threshold) is set in accordance with the vehicle speed, as described above.

In Step 2, the accelerator-opening-degree threshold may be corrected in accordance with the driving mode. More specifically, the standard accelerator-opening-degree threshold obtained in Step 1 may corrected such that the accelerator-opening-degree threshold is increased if the current driving mode is a driving mode which requires high acceleration performance.

In Step 3, the accelerator-opening-degree threshold may be corrected in accordance with the ambient air density. More specifically, the accelerator-opening-degree threshold may be further corrected such that the accelerator-opening-degree threshold is increased as the air density decreases.

In Step 4, the correction based on the inclination of the road on which the vehicle is currently traveling and the weight of the load on the vehicle is performed. More specifically, the accelerator-opening-degree threshold may be further corrected such that the accelerator-opening-degree threshold is increased as the inclination of the road increases and as the weight of the load increases.

In Step 5, the correction based on the following distance behind the vehicle in front is performed. More specifically, the accelerator-opening-degree threshold may be further corrected such that the accelerator-opening-degree threshold is increased as the following distance behind the vehicle in front increases.

In Step 6, the correction based on the difference between the current vehicle speed and the legal speed is performed. More specifically, assuming that the current vehicle speed is lower than the legal speed for the road on which the vehicle is currently traveling, the accelerator-opening-degree threshold may be further corrected such that the accelerator-opening-degree threshold is increased as the difference between the legal speed and the current vehicle speed increases.

In Steps 2 through 6, the corrections may be performed by suitable methods, such as multiplication by a correction coefficient or addition of an amount of correction.

In Step 7, the actual opening degree of the accelerator 2, which may be constantly detected, is compared with the final accelerator-opening-degree threshold determined by performing Steps 1 through 6. In the case where the opening degree of the accelerator 2 is larger than the accelerator-opening-degree threshold, the process proceeds to Step 8, where the reaction force of the accelerator 2 is increased from the basic reaction force.

In the above-described exemplary embodiment, the accelerator-opening-degree threshold is set in accordance with the initial vehicle speed at the time when the accelerator 2 is operated by the driver in the opening-degree-increasing direction (when the accelerator 2 is depressed from a completely closed state or a partially opened state). However, the accelerator-opening-degree threshold may also be set by constantly detecting the vehicle speed while the opening degree of the accelerator 2 is being increased.

Figure 7:
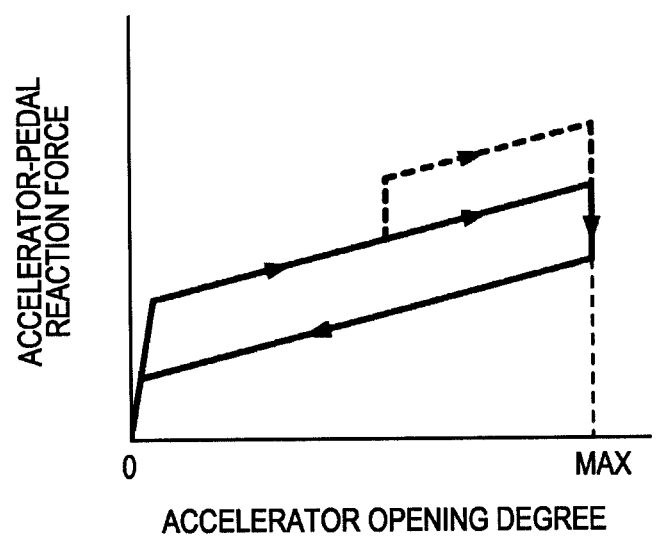
FIG. 7 is a characteristic diagram showing the characteristics of the accelerator reaction force according to a second exemplary embodiment of the present disclosure.

FIG. 7 schematically shows the characteristic of the accelerator reaction force according to a second exemplary embodiment. The basic reaction force may substantially change in proportion to the accelerator opening degree with a suitable hysteresis depending on whether the opening is increased or reduced. When the accelerator opening degree is increased, that is, when the accelerator is depressed, the accelerator reaction force may be increased stepwise from the basic reaction force, as shown by the dashed line, provided that the accelerator opening degree exceeds a predetermined accelerator opening degree and an accelerator-opening-degree change rate exceeds a predetermined change-rate threshold.

Figure 8:
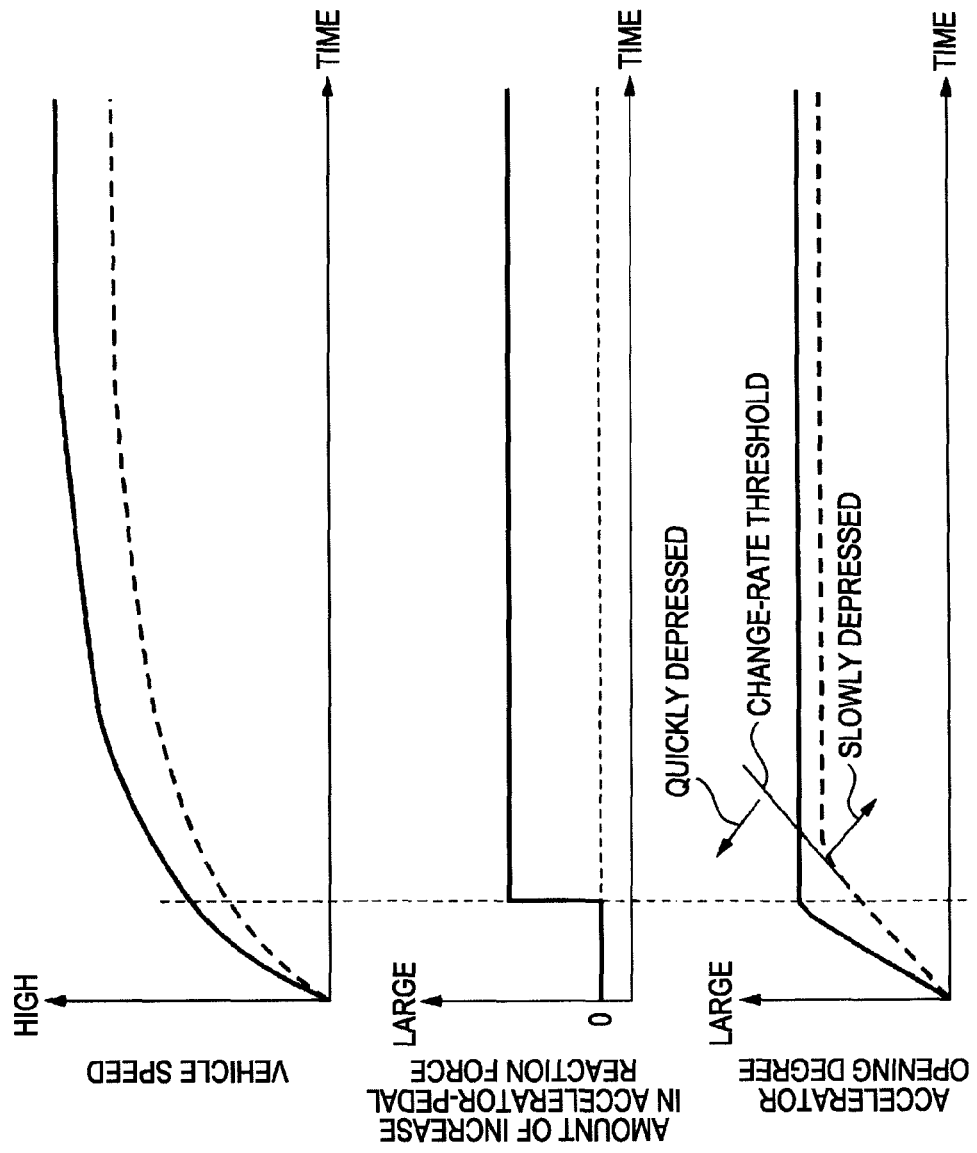
FIG. 8 is a timing chart illustrating the variation in the vehicle speed, the amount of increase in the accelerator reaction force, and the accelerator opening degree after the vehicle is started from a stopped state.

FIG. 8 is a time chart showing the example in which the accelerator reaction force is increased in accordance with the accelerator-opening-degree change rate after the vehicle is started from a stopped state. When the vehicle is started from a stopped state, if the depressing speed of the accelerator 2, that is, the accelerator-opening-degree change rate, is higher than a predetermined change-rate threshold, the reaction force of the accelerator 2 may be increased, as shown by the solid line in FIG. 8. If the depressing speed of the accelerator 2, that is, the accelerator-opening-degree change rate, is equal to or lower than the predetermined change-rate threshold, the reaction force of the accelerator 2 may not be increased, as shown by the dashed line in FIG. 8.

The increase in the reaction force of the accelerator 2 for the accelerator-opening-degree increasing direction may be immediately eliminated when, for example, the operating direction of the accelerator 2 is changed to an accelerator-opening-degree reducing direction, or when the accelerator opening degree is reduced and becomes equal to or less than the above-described predetermined accelerator-opening-degree threshold. Here, the depressing speed of the accelerator 2, that is, the accelerator-opening-degree change rate, is a rate of change in the accelerator opening degree with time, and is represented by an inclination of the accelerator opening degree curve in FIG. 8. If the inclination is small, it means that the accelerator 2 is slowly depressed. If the inclination is large, it means that the accelerator 2 is quickly depressed.

In the present exemplary embodiment, referring to FIG. 9, the control unit 10 may change the change-rate threshold at which the reaction force of the accelerator 2 is increased as follows. That is, the change-rate threshold may be changed in accordance with a vehicle speed at the time when the operation of increasing the opening degree of the accelerator 2 is started by the driver, that is, in accordance with an initial vehicle speed at the time when the accelerator 2 is depressed from a completely closed state or a partially opened state. More specifically, if the vehicle speed at the time when the opening degree of the accelerator 2 starts to increase is low, a first change-rate threshold, which is relatively low, may be selected. If the vehicle speed at the time when the opening degree of the accelerator 2 starts to increase is high, a second change-rate threshold, which is relatively high, may be selected.

In the case where the vehicle speed is low at the time when the operation of increasing the opening degree of the accelerator 2 is started, the reaction force may be increased at a relatively small accelerator-opening-degree change rate. Therefore, a reaction-force increasing range shown by the shaded area in FIG. 9 is large. In contrast, in the case where the vehicle speed is high at the time when the operation of increasing the opening degree of the accelerator 2 is started, the reaction force may not increase until the accelerator-opening-degree change rate exceeds a relatively high accelerator-opening-degree change rate. Therefore, a reaction-force non-increasing range in which the reaction force is not increased is relatively large.

Figure 9:
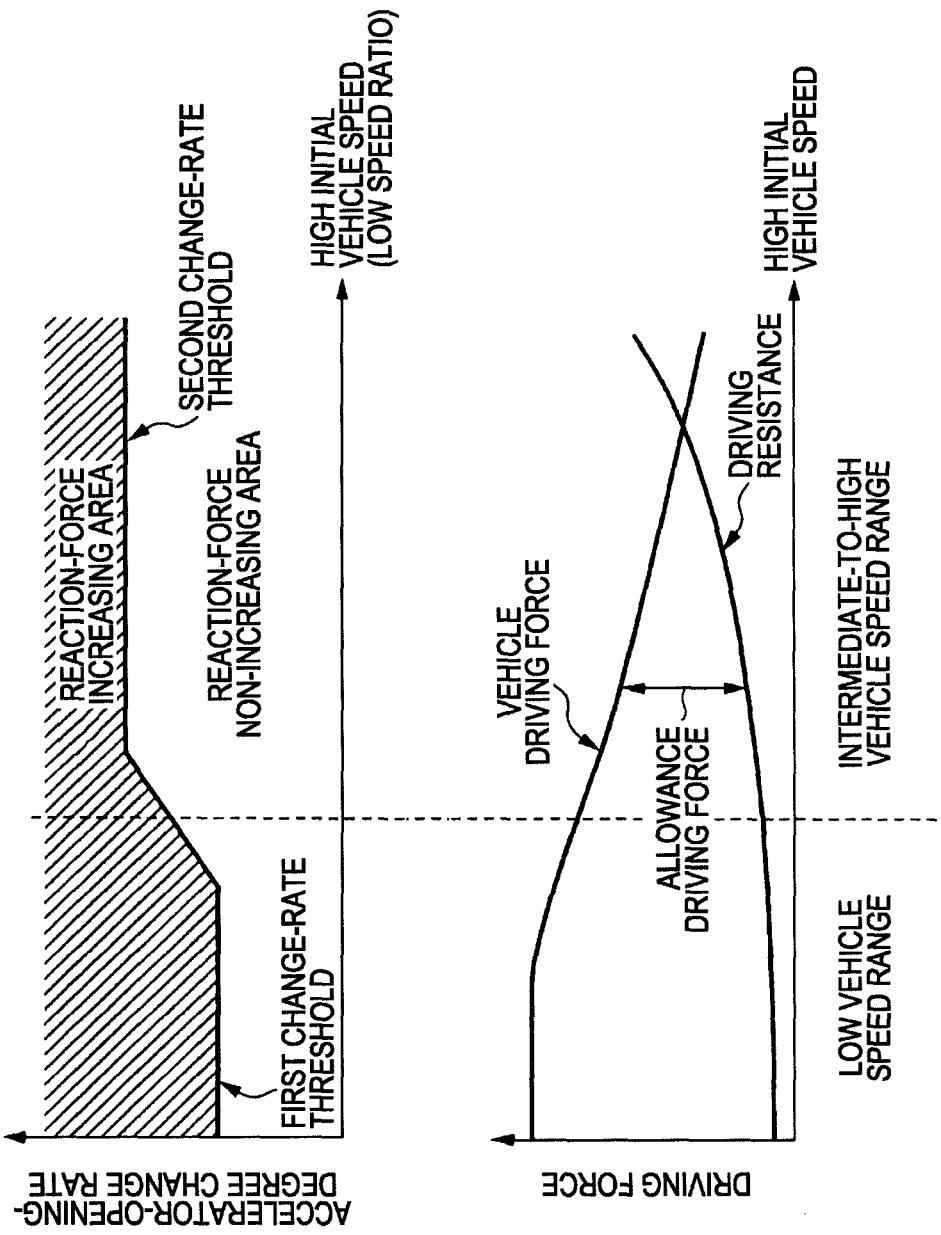
FIG. 9 is a diagram illustrating the relationship between the change-rate threshold, the driving force obtained at a maximum accelerator opening degree, and the driving resistance.

In the range between the first change-rate threshold and the second change-rate threshold, the change-rate threshold may continuously change from the first change-rate threshold to the second change-rate threshold in accordance with the vehicle speed, as shown in FIG. 9.

FIG. 9 is a schematic diagram illustrating the relationship between the change-rate threshold, the driving force characteristic at the maximum accelerator opening degree obtained under the assumption that speed change control is suitably performed, and the driving resistance, with respect to the vehicle speed represented by the horizontal axis. As shown in FIG. 9, in a low vehicle speed range which corresponds to, for example, a period immediately after the vehicle is started from a stopped state, the speed-change ratio of the transmission is high. Therefore, the vehicle driving force obtained at the maximum accelerator opening degree is large. Because a large vehicle driving force is generated even when the amount of operation of the accelerator is small, there is a high possibility that excessive vehicle driving force may be generated and unnecessary acceleration may be performed. Therefore, in the low vehicle speed range, the change-rate threshold may be set to the first change-rate threshold, which is relatively low. Because the reaction force of the accelerator 2 is increased at a relatively small accelerator-opening-degree change rate, excessive depression of the accelerator 2 by the driver may be suppressed and the overall fuel consumption may be reduced.

In an intermediate-to-high vehicle speed range, the speed-change ratio of the transmission is low. Therefore, the vehicle driving force obtained at the maximum accelerator opening degree is small, and an amount of increase in the vehicle driving force corresponding to a certain amount of operation of the accelerator is also relatively small. Therefore, unnecessary acceleration may not easily occur. In addition, in the intermediate-to-high vehicle speed range, the driving resistance (air resistance and rolling resistance) of the vehicle is high, and therefore a large driving force is required to maintain the vehicle speed. In addition, an allowance driving force, which is a difference between the vehicle driving force at the maximum accelerator opening degree and the driving resistance, is small. If the reaction force of the accelerator 2 is increased in this state, it may become difficult to further depress the accelerator 2 and the vehicle may not be accelerated. Therefore, in the intermediate-to-high vehicle speed range, the change-rate threshold is set to the second change-rate threshold, which is relatively high. Thus, the reaction force may be maintained at the basic reaction force and quick depression of the accelerator 2 may be allowed until the accelerator-opening-degree change rate exceeds a relatively large change rate. As a result, the vehicle may be smoothly accelerated.

The change-rate threshold may continuously change between the first change-rate threshold and the second change-rate threshold in accordance with the vehicle speed. Therefore, the accelerator 2 may be operated without making the driver feel an uncomfortable sensation. Even when the vehicle speed is at the boundary between the low vehicle speed range and the intermediate-to-high vehicle speed range, the change-rate threshold is not changed stepwise at a certain vehicle speed. Therefore, the driver may operate the accelerator 2 without feeling an uncomfortable sensation. In the above-described exemplary embodiment, the change-rate threshold is set based on two stages, that is, between the first change-rate threshold and the second change-rate threshold. However, the present disclosure is not limited to this, and the change-rate threshold may also be set based on three or more stages. Alternatively, the change-rate threshold may be set such that the change-rate threshold is continuously changed over the entire vehicle speed range.

In the above-described exemplary embodiment, the vehicle speed is used as a parameter which shows the driving resistance of the vehicle and the driving force characteristic at the maximum accelerator opening degree. Therefore, the change-rate threshold is substantially set in consideration of both the driving resistance of the vehicle and the driving force characteristic at the maximum accelerator opening degree. However, the change-rate threshold may also be set on the basis of only the driving force characteristic at the maximum accelerator opening degree. For example, the speed-change ratio of the transmission may be used as a parameter which shows the driving force characteristic at the maximum accelerator opening degree, and the change-rate threshold may be set in accordance with the current speed-change ratio. FIG. 9 shows the driving force characteristic at the maximum accelerator opening degree in the case where, for example, the transmission is a continuously variable transmission. The driving force characteristic with respect to the vehicle speed in the case where the transmission is an automatic transmission including a multi-speed auxiliary transmission or a manual transmission is basically similar to the driving force characteristic shown in FIG. 9. More specifically, the vehicle driving force is large in the low vehicle speed range because the speed-change ratio is high, and the vehicle driving force is small in the intermediate-to-high vehicle speed range because the speed-change ratio is low. Therefore, in the case where, for example, the transmission is a multi-speed transmission, the change-rate threshold may be selected from a plurality of thresholds in accordance with the speed-change ratio of the transmission.

The change-rate threshold may also be set using a parameter other than the vehicle speed as a parameter which shows the driving resistance. For example, the driving resistance of the vehicle increases when the inclination of the road (the sign of the inclination is positive for the ascending road) is large or when the weight of load on the vehicle is large (for example, when a large number of people are on-board the vehicle). Therefore, the change-rate threshold for when the inclination is large may be set to be higher than the change-rate threshold for when the inclination is small. In addition, the change-rate threshold for when the weight of the load is large may be set to be higher than the change-rate threshold for when the weight of the load is small.

As described above, the change-rate threshold may be set on the basis of the driving resistance of the vehicle or the driving force characteristic at the maximum accelerator opening degree. The determined change-rate threshold may also be corrected in accordance with other factors, as shown in FIG. 5. The change-rate threshold may be corrected in accordance with, for example, a density of air introduced into the internal combustion engine, a driving mode, such as a sports mode and an economy mode, a following distance behind a leading vehicle, or a difference between the current speed and a legal speed limit.

The correction based on the air density may be performed to compensate for a reduction in the output of the internal combustion engine due to a reduction in the air density, which may occur in a high-altitude environment or a high-temperature environment. As shown by the dashed line in FIG. 10, the change-rate threshold is increased as the air density decreases.

Figure 10:
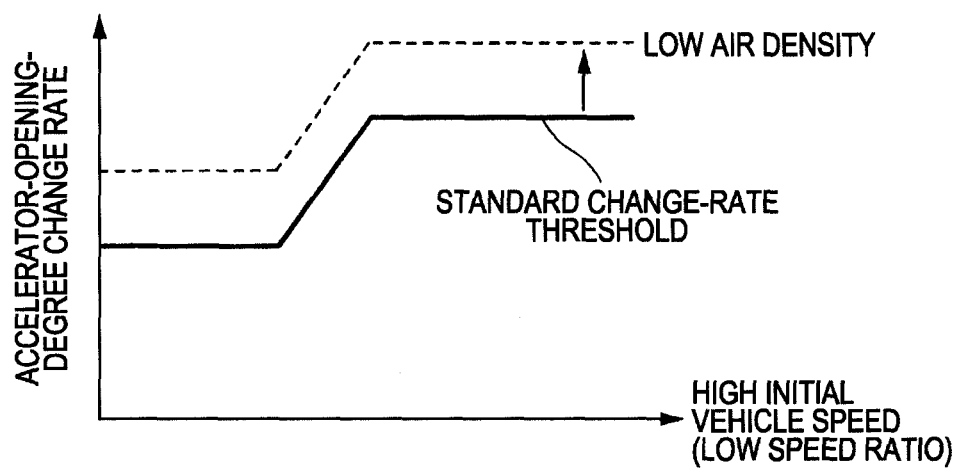
FIG. 10 is a characteristic diagram illustrating the manner in which the change-rate threshold relative to the vehicle speed is corrected in accordance with an air density.

With regard to the correction based on the driving mode, the change-rate threshold may be increased, as in the case shown in FIG. 10, when the current driving mode is a mode which requires high acceleration performance.

With regard to the correction based on the following distance between the vehicle and a vehicle in front, the change-rate threshold may be increased as the following distance increases.

The change-rate threshold may also be corrected on the basis of the difference between the current vehicle speed and the legal speed for the road on which the vehicle is currently traveling. Assuming that the current vehicle speed is lower than the legal speed, the correction may be performed such that the change-rate threshold is increased as the difference between the legal speed and the current vehicle speed increases.

Thus, the change-rate threshold determined on the basis of the driving resistance or the driving force characteristic at the maximum accelerator opening degree may be corrected on the basis of, for example, the air density, the driving mode, the following distance behind the vehicle in front, and the difference between the current vehicle speed and the legal speed. Thus, the reaction force of the accelerator 2 may be adequately increased and the vehicle may be smoothly driven in accordance with the intention of the driver.

FIG. 11 is a flowchart of an accelerator reaction force control process according to the present embodiment. The flowchart will now be described.

First, in Step 11, it is determined whether or not the current position of the accelerator 2, that is, the current accelerator opening degree, exceeds a predetermined accelerator-opening-degree threshold. The process proceeds to Step 12 if the current accelerator opening degree exceeds the predetermined accelerator-opening-degree threshold. If the current accelerator opening degree is equal to or less than the predetermined accelerator-opening-degree threshold, the routine is terminated. If the accelerator opening degree is sufficiently small, no acceleration which reduces the fuel efficiency may be performed. Therefore, according to the present exemplary embodiment, the process of increasing the reaction force is not performed irrespective of the accelerator-opening-degree change rate.

In Step 12, the vehicle speed at the time when the opening degree of the accelerator 2 has started to increase is detected. Then, a standard change-rate threshold (a base change-rate threshold) is set in accordance with the vehicle speed, as described above.

In Step 13, the change-rate threshold is corrected in accordance with the driving mode. More specifically, the standard change-rate threshold obtained in Step 12 is corrected such that the change-rate threshold is increased if the current driving mode is a driving mode which requires high acceleration performance.

In Step 14, the change-rate threshold is corrected in accordance with the ambient air density. More specifically, the change-rate threshold is further corrected such that the change-rate threshold is increased as the air density decreases.

In Step 15, the correction based on the inclination of the road on which the vehicle is currently traveling and the weight of the load on the vehicle is performed. More specifically, the change-rate threshold is further corrected such that the change-rate threshold is increased as the inclination of the road increases and as the weight of the load increases.

In Step 16, the correction based on the following distance behind the vehicle in front is performed. More specifically, the change-rate threshold is further corrected such that the change-rate threshold is increased as the following distance behind the vehicle in front increases.

In Step 17, the correction based on the difference between the current vehicle speed and the legal speed is performed. More specifically, assuming that the current vehicle speed is lower than the legal speed for the road on which the vehicle is currently traveling, the change-rate threshold is further corrected such that the change-rate threshold is increased as the difference between the legal speed and the current vehicle speed increases.

In Steps 13 through 17, the corrections may be performed by suitable methods, such as multiplication by a correction coefficient or addition of an amount of correction.

In Step 18, the actual change rate of the opening degree of the accelerator 2, which is constantly calculated, is compared with the final change-rate threshold determined by performing Steps 12 through 17. In the case where the change rate of the opening degree of the accelerator 2 is larger than the change-rate threshold, the process proceeds to Step 19, where the reaction force of the accelerator 2 is increased from the basic reaction force.

In the above-described exemplary embodiment, the change-rate threshold is set in accordance with the initial vehicle speed at the time when the accelerator 2 is operated by the driver in the opening-degree-increasing direction (when the accelerator 2 is depressed from a completely closed state or a partially opened state). However, the change-rate threshold may also be set by constantly detecting the vehicle speed while the opening degree of the accelerator 2 is being increased.

The specific fuel consumption changes in accordance with the opening degree of the accelerator 2, and the instantaneous specific fuel consumption may be calculated from the opening degree of the accelerator 2 and the change rate thereof. The thus-calculated specific fuel consumption may be displayed on an instrument panel in front of the driver's seat or on a car navigation screen. In such a case, the driver may drive the vehicle while visually recognizing that the reaction force of the accelerator 2 increases when the fuel efficiency decreases. Therefore, the fuel consumption may be effectively reduced.

In the above-described exemplary embodiments, the reaction force is increased in accordance with the accelerator opening degree or the change rate of the accelerator opening degree which affects the fuel consumption. However, the present disclosure may also be applied to the case in which a threshold is set directly for the specific fuel consumption and the reaction force is increased when the current specific fuel consumption exceeds the threshold.

In addition, according to the above-described exemplary embodiments, the position of the accelerator 2 itself (amount of depression) is detected as the accelerator opening degree. Therefore, in the above-described exemplary embodiment, the amount of depression of the accelerator 2 is substantially equivalent to the accelerator opening degree, and the change rate in the position of the accelerator 2 is substantially equivalent to the accelerator-opening-degree change rate. However, the control operation according to the present disclosure may also be performed by using, for example, an opening degree of the throttle valve, which is operationally associated with the accelerator 2, as the accelerator opening degree.

The vehicle in which the accelerator reaction force control apparatus according to the present disclosure is used is not limited to a vehicle having an internal combustion engine as a drive source. For example, the accelerator reaction force control apparatus according to the present disclosure may also be used in an electric automobile or a hybrid automobile.

Advantageously, an accelerator reaction force control apparatus may set an accelerator reaction force to be greater than a basic reaction force when an accelerator opening degree exceeds an accelerator-opening-degree threshold or when a change rate in the accelerator opening degree exceeds a predetermined change-rate threshold. The accelerator-opening-degree threshold or the change-rate threshold may be set in consideration of the driving force characteristics of the vehicle at a predetermined accelerator opening degree.

Advantageously, the accelerator-opening-degree threshold or the change-rate threshold may be set in accordance with the driving force characteristics of the vehicle. The accelerator-opening-degree threshold or the change-rate threshold for when the vehicle driving force at the predetermined accelerator opening degree is relatively small may be higher than the accelerator-opening-degree threshold or the change-rate threshold for when the vehicle driving force at the predetermined accelerator opening degree is relatively large.

Advantageously, when the driver depresses the accelerator, the reaction force of the accelerator may be increased from the basic reaction force if the accelerator opening degree exceeds the predetermined accelerator-opening-degree threshold or if the change rate of the accelerator opening degree exceeds the predetermined change-rate threshold. Therefore, excessive depression of the accelerator may be suppressed and fuel consumption may be reduced.

Advantageously, in a case where it is desirable to largely increase the accelerator opening degree to accelerate the vehicle as intended by the driver, if the reaction force of the accelerator is increased, the accelerator may not be sufficiently depressed and the vehicle may not be smoothly accelerated. However, in selected embodiments disclosed herein, the accelerator-opening-degree threshold or the change-rate threshold may be increased in such a case. For example, when the accelerator is depressed, the reaction force may be maintained at the basic reaction force until the accelerator opening degree exceeds a relatively large accelerator opening degree. As a result, the vehicle may be accelerated as intended by the driver.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method to control a vehicle, the method comprising:
   detecting an opening degree of an accelerator; and
   adjusting a reaction force of the accelerator,
   wherein the reaction force of the accelerator is increased when the opening degree of the accelerator exceeds a first threshold value at a high vehicle speed range,
   wherein the reaction force of the accelerator is increased when the opening degree of the accelerator exceeds a second threshold value at a low vehicle speed range including a vehicle starting time,
   wherein the first threshold value is set higher than the second threshold value, and
   wherein at the vehicle starting time the second threshold value is greater than the opening degree of the accelerator at a closed state.

2. A control apparatus of a vehicle, comprising:
   a detector to detect an opening degree of an accelerator; and
   a controller to adjust a reaction force of the accelerator, wherein the controller is configured to increase the reaction force of the accelerator when the accelerator opening degree exceeds a threshold value;
wherein the threshold value at a high vehicle speed range is defined as a first threshold value,
wherein the threshold value at a low vehicle speed range including a vehicle starting time is defined as a second threshold value,
wherein the first threshold value is higher than the second threshold value, and
wherein, at the vehicle starting time, the second threshold value is greater than the accelerator opening degree at a closed state.

3. The control apparatus of claim 2, wherein the threshold value comprises at least one of an accelerator opening degree threshold and an accelerator rate change threshold.

4. The control apparatus of claim 2, wherein the threshold value increases as the inclination of the road increases.

5. The control apparatus of claim 2, wherein the threshold value increases as a load weight of the vehicle increases.

6. The control apparatus of claim 2, wherein the threshold value increases for a drive mode in which the acceleration demand of the vehicle increases.

7. The control apparatus of claim 2, wherein the threshold value increases as a distance between the vehicle and a preceding vehicle increases.

8. The control apparatus of claim 2, wherein the threshold value increases as a speed difference between the current vehicle speed and a legal speed for the road on which the vehicle is currently traveling increases.

9. The control apparatus of claim 2, wherein the threshold value increases as an air density decreases.

10. A control apparatus of a vehicle, comprising:
a detector to detect an opening degree of an accelerator; and
a controller to adjust a reaction force of the accelerator,
wherein the controller is configured to increase the reaction force of the accelerator when the accelerator opening degree exceeds a threshold value;
wherein the threshold value at a low speed-change ratio is a first threshold value,
wherein the threshold value at a high speed-change ratio is a second threshold value,
wherein the first threshold value is higher than the second threshold value,
wherein a vehicle starting time has the high speed-change ratio, and
wherein, at the vehicle starting time, the second threshold value is greater than the accelerator opening degree at a closed state.

11. The control apparatus of claim 10, wherein the threshold value comprises at least one of an accelerator opening degree threshold and an accelerator rate change threshold.

12. The control apparatus of claim 10, wherein the threshold value increases as the inclination of the road increases.

13. The control apparatus of claim 10, wherein the threshold value increases as a load weight of the vehicle increases.

14. The control apparatus of claim 10, wherein the threshold value increases for a drive mode in which the acceleration demand of the vehicle increases.

15. The control apparatus of claim 10, wherein the threshold value increases as a distance between the vehicle and a preceding vehicle increases.

16. The control apparatus of claim 10, wherein the threshold value increases as a speed difference between the current vehicle speed and a legal speed for the road on which the vehicle is currently traveling increases.

17. The control apparatus of claim 10, wherein the threshold value increases as an air density decreases.

* * * * *